United States Patent [19]

Deubzer et al.

[11] 4,260,726
[45] Apr. 7, 1981

[54] THERMOSETTING ORGANOPOLYSILOXANE COMPOSITIONS

[75] Inventors: Bernward Deubzer, Burghausen, Fed. Rep. of Germany; Erich Brunner, Gmunden, Austria

[73] Assignee: Wacker-Chemie GmbH, Munich, Fed. Rep. of Germany

[21] Appl. No.: 40,342

[22] Filed: May 18, 1979

[30] Foreign Application Priority Data

Jun. 5, 1978 [DE] Fed. Rep. of Germany ....... 2824630

[51] Int. Cl.³ ............................................... C08G 77/06
[52] U.S. Cl. ....................................... 528/15; 528/31; 528/32; 260/37 SB
[58] Field of Search ............................. 528/15, 31, 32

[56] References Cited

U.S. PATENT DOCUMENTS

| | | | |
|---|---|---|---|
| 3,188,299 | 6/1965 | Chalk | 528/32 |
| 3,192,181 | 6/1965 | Moore | 528/32 |
| 3,445,420 | 5/1969 | Kookootsedes et al. | 528/15 |
| 3,882,083 | 5/1975 | Berger et al. | 528/31 |

Primary Examiner—Melvyn I. Marquis

[57] ABSTRACT

Organopolysiloxane compositions which are stable at room temperature, but are curable when subjected to elevated temperatures comprising (1) an organosilicon compound containing Si-bonded hydrogen, (2) an organosilicon compound containing aliphatic multiple bonds, (3) a catalyst capable of promoting the addition of Si-bonded hydrogen to the aliphatic multiple bonds and (4) an organic compound as an additive containing at least one group of the formula

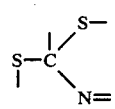

in which the additive inhibits curing at room temperature.

4 Claims, No Drawings

THERMOSETTING ORGANOPOLYSILOXANE COMPOSITIONS

This invention relates to organopolysiloxane compositions and more particularly to thermosetting organopolysiloxane compositions which are stable at room temperature, but upon the application of heat are curable to a solid.

BACKGROUND OF INVENTION

Organopolysiloxane compositions containing an organopolysiloxane having aliphatic multiple bonds and an organohydrogensiloxane will cross-link in the presence of catalysts, which promote the addition of Si-bonded hydrogen to the aliphatic multiple bonds at room temperature to form elastomers. Generally, these compositions must be applied immediately after mixing, otherwise the mixture gels rapidly to a state where they can not be worked. Since these compositions gel very rapidly, they are not practical for some applications.

Accordingly, additives have been added to room temperature curable compositions containing organopolysiloxanes having aliphatic multiple bonds, organohydrogensiloxanes containing Si-bonded hydrogen and a platinum catalyst to inhibit curing of these compositions at room temperature. These compositions containing the additives are stable for extended periods of time at room temperature, but upon the application of heat at some future time, cure to an elastomeric solid.

Organopolysiloxane compositions containing various additives to inhibit curing at room temperature, are described for example in U.S. Pat. No. 3,192,181 to Moore which discloses an organosilicon compound containing (1) an organosilicon compound having on the average at least two monovalent radicals containing aliphatic unsaturation, (2) an organosilicon compound containing silicon-bonded hydrogen atoms, (3) a platinum catalyst and (4) benzotriazole, which prevents the platinum catalyst from catalyzing the reaction between SiH in (2) and the aliphatic unsaturated radicals in (1). Also, U.S. Pat. No. 3,445,420 to Kookootsedes et al disclose a mixture of an olefin containing organosilicon polymer, an organosilicon compound containing silicon-bonded hydrogen atoms, a platinum catalyst and an organic compound having a boiling point of at least 25° C. and at least one —C≡C— group. The resultant composition does not cure as long as it is sealed from the air, but when exposed to air at room temperature or at low temperatures, is curable. Likewise, U.S. Pat. No. 3,882,083 to Berger et al discloses organopolysiloxanes which are stable at room temperature, but which are curable upon the application of heat comprising (1) an olefinorganopolysiloxane, (2) an organohydrogenpolysiloxane, (3) a platinum catalyst and (4) an ethylenically unsaturated isocyanurate which provides the compositions with latent curing properties. Organopolysiloxane compositions containing (1) an alkenyl polysiloxane, (2) a hydrogenpolysiloxane, (3) platinum catalyst and (4) nitrogen-containing compounds such as pyridine, dialkyl formamides and alkyl thioureas are described in U.S. Pat. No. 3,188,299 to Chalk. While these nitrogen-containing compounds reduce the activity of platinum catalysts in a temperature range of from 20° to 30° C., they do not inhibit curing at temperatures above about 40° C.

In contrast to the organopolysiloxane compositions described above containing additives which retard or inhibit curing at room temperature, the organopolysiloxane compositions of this invention not only inhibit curing at room temperature, but also inhibit curing at temperatures in the range of from 40° to 80° C. However, at temperatures in excess of 100° C. and especially at temperatures in excess of 150° C., they cure very rapidly. Thus, the compositions of this invention may be easily worked at room temperature or at slightly elevated temperatures without premature gellation. This property is especially important in many industrial applications.

Therefore, it is an object of this invention to provide a thermosetting organopolysiloxane composition. Another object of this invention is to provide an organopolysiloxane composition which is essentially stable at temperatures up to about 80° C. Still another object of this invention is to provide a composition which has an extended shelf-life even at temperatures slightly above room temperature. A further object of this invention is to provide a composition which is essentially stable at temperatures up to about 80° C., but when heated to temperatures in excess of 100° C., cures to a solid.

SUMMARY OF INVENTION

The foregoing objects and others which will become apparent from the following description are accomplished in accordance with this invention, generally speaking, by providing (1) an organosilicon compound having an average of at least 2 Si-bonded hydrogen atoms per molecule, (2) an organosilicon compound having aliphatic multiple bonds, (3) a catalyst capable of promoting the addition of the Si-bonded hydrogen to the aliphatic multiple bonds and (4) an additive having at least one group of the formula

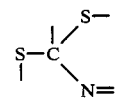

which inhibits curing of the composition at room temperature.

DETAILED DESCRIPTION OF INVENTION

The organosilicon compounds (1) having Si-bonded hydrogen which are used in the compositions of this invention are the same organosilicon compounds having Si-bonded hydrogen which have been used heretofore in organopolysiloxane compositions which are cured by the addition of Si-bonded hydrogen to aliphatic multiple bonds. These organosilicon compounds have units of the general formula $$R_m SiO_{(4-m)/2},$$

where R represents hydrogen or the same or different monovalent or substituted monovalent hydrocarbon radicals and at least 2 and preferably at least 3 Si-bonded hydrogen atoms are present per molecule and m is 0, 1, 2 or 3. Preferably m is at least 1. Moreover, these units contain on the average at least as many organic radicals as Si-bonded hydrogen atoms.

Organosilicon compounds (2) having aliphatic multiple bonds which may be used in the compositions of this invention are the same organosilicon compounds which have been used heretofore in organopolysiloxane compositions which are cured by the addition of silicon-bonded hydrogen to the aliphatic multiple bonds. These organosilicon compounds generally have units of the formula:

$$R^1_{m'}SiO_{(4-m')/2},$$

where $R^1$ is the same or different, monovalent, or substituted monovalent hydrocarbon radicals, in which at least 2 of the $R^1$ radicals but preferably not more than 50 percent of the number of $R^1$ radicals in each molecule have aliphatic multiple bonds and m' is also 0, 1, 2 or 3 but on the average is from 0.9 to 2.1.

Aliphatic multiple bonds and Si-bonded hydrogen atoms may be present in various types or in one and the same type of organosilicon compound.

It is preferred that the monovalent hydrocarbon radicals or substituted monovalent hydrocarbon radicals represented by R and $R^1$ have from 1 to 18 carbon atoms. Examples of hydrocarbon radicals represented by R and $R^1$ which are free of aliphatic multiple bonds are alkyl radicals, such as the methyl, ethyl, n-propyl and isopropyl radicals, as well as octadecyl radicals; cycloalkyl radicals such as the cyclohexyl and cycloheptyl radicals; aryl radicals such as the phenyl radical; alkaryl radicals such as the tolyl radicals; and aralkyl radicals such as the benzyl and the beta-phenylethyl radicals. Examples of substituted monovalent hydrocarbon radicals represented by R and $R^1$ which are free of aliphatic multiple bonds, are halogenated hydrocarbon radicals such as the 3,3,3-trifluoropropyl radical; o-, p- and m-chlorophenyl radicals, as well as cyanoalkyl radicals such as the beta-cyanoethyl radical. Because they are more readily available, it is preferred that at least 50 percent of the R radicals which do not contain Si-bonded hydrogen and at least 50 percent of the $R^1$ radicals which are free of aliphatic multiple bonds, be methyl radicals.

Examples of hydrocarbon radicals represented by R and $R^1$ having aliphatic multiple bonds are the ethinyl, vinyl, allyl, methallyl and butadienyl radicals, with the vinyl radical being the preferred radical.

It is preferred that in the compositions of this invention that the organosilicon compounds having Si-bonded hydrogen be present in such an amount that from 0.1 to 15 Si-bonded hydrogen atoms are present for each aliphatic multiple bond.

Catalysts which may be used to promote the addition of Si-bonded hydrogen to aliphatic multiple bonds, in the compositions of this invention are the same catalysts which could have been used heretofore in known organopolysiloxane compositions which cure by the addition of Si-bonded hydrogen to aliphatic multiple bonds. Examples of such catalysts are metallic and finely dispersed platinum, ruthenium, rhodium, palladium and iridium, which metals may be applied to carriers such as silicon dioxide, aluminum oxide or active carbon; as well as compounds or complexes of all of said elements, such as platinum halides, for example $PtCl_4$, $PtCl_6 \cdot 6H_2O$, complexes such as $Na_2PtCl_4$, platinum-olefin complexes, platinum-alcohol or platinum-alcoholate complexes, platinum-ether complexes, platinum-aldehyde complexes, platinum-vinylsiloxane complexes, especially platinum-divinyltetramethyldisiloxane complexes, with or without a detectable amount of halogen, bis-(gamma-picoline)platinum-dichloride, trimethylenepyridine-platinum-dichloride; as well as iron, nickel and cobalt carbonyls, as well as iron, nickel and cobalt complexes.

Platinum and platinum complexes are the preferred catalysts.

When the previously mentioned precious metals, their compounds or their complexes are used as catalysts to promote the addition of Si-bonded hydrogen to aliphatic multiple bonds, then the catalysts are preferably employed in an amount of from 0.5 to 500 ppm (parts by weight per million), and more preferably in an amount of from 2 to 400 ppm by weight, calculated as the weight of the elemental metal based on the total weight of the organopolysiloxanes present in the compositions of this invention.

Examples of organic compounds containing at least one group of the formula:

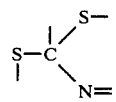

are dithiocarbamic acids, i.e., compounds having the following formula:

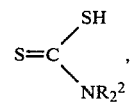

in which $R^2$ may be the same as R or it may represent a hydrocarbon radical having at least one heteroatom, and the $R^2$ radicals may be joined together so as to form a ring, except where at least one $R^2$ radical represents hydrogen; salts of these acids, such as dithiocarbamyl-sulfenamide, i.e., a compound having the general formula:

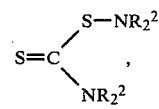

where $R^2$ is the same as above, thiuram monosulfides, i.e., compounds having the general formula:

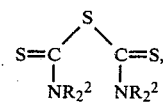

where $R^2$ is the same as above, thiuram disulfides, i.e., compounds having the general formula:

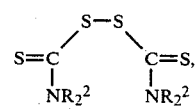

where $R^2$ is the same as above, 2-mercaptobenzothiazole, i.e., a compound of the following formula:

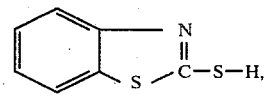

and derivatives of 2-mercaptobenzothiazole, in which at least the hydrogen atom of the mercapto group is substituted.

In the above formulas, the radicals represented by $R^2$ may be the same or different.

A preferred example of a dithiocarbamic acid is N,N-dimethyldithiocarbamic acid.

Examples of salts of dithiocarbamic acids are piperidine-N-pentamethylenedithiocarbamate, zinc-N,N-dibenzyldithiocarbamate, bismuth-N,N-dimethyldithiocarbamate, tellurium-N,N-diethyldithiocarbamate, zinc-N,N-di-n-butyldithiocarbamate, zinc-N,N-dimethyldithiocarbamate and lead di-N,N-methyldithiocarbamate.

An Example of a dithiocarbamylsulfenamide is N,N-tetramethyldithiocarbamylsulfenamide.

Examples of thiuram monosulfides are tetramethylthiuram monosulfide, tetra-n-octadecylthiuram monosulfide and di-N-pentamethylenethiuram monosulfide.

Examples of thiuram disulfides are tetramethylthiuram disulfide, tetra-n-butylthiuram disulfide. Other thiuram sulfides which may be used are di-N-pentamethylene thiuram tetrasulfide.

Examples of derivatives of 2-mercaptobenzothiazole in which the hydrogen atom of the mercapto group is substituted, are zinc benzothiazylsulfide, dibenzothiazyl disulfide, benzothiazyl-2-N,N-diethylsulfenamide, benzothiazyl-2-N-cyclohexylsulfenamide and benzothiazyl-2-N,N-diisopropylsulfenamide.

Organic compounds having at least one group of the following:

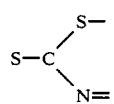

are preferably used in amounts of from $1 \times 10^{-4}$ to 0.5 percent by weight and more preferably from 0.01 to 0.1 percent by weight, based on the total weight of the organosilicon compounds present in the compositions. The greater the amount of the organic compound containing at least one group of the formula,

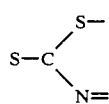

the slower the curing of the compositions of this invention at temperatures below 80° C. In otherwords the greater the amount of the organic compound containing the above group, the less likely it is that the compositions of this invention will cure at temperatures below 80° C. and conversely, the higher the temperature required to induce curing of the compositions.

In addition to the organosilicon compound or compounds having Si-bonded hydrogen and an aliphatic multiple bond, a catalyst which promotes the addition of Si-bonded hydrogen to an aliphatic multiple bond and a compound containing at least one group of the formula

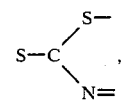

the compositions of this invention may also contain other substances which were generally employed heretofore in organopolysiloxanes which can be cured by the addition of Si-bonded hydrogen to an aliphatic multiple bond. Examples of such other substances are fillers having a surface area of at least 50 m²/g, such as pyrogenically produced silicon dioxide, fillers having a surface area of less than 50 m²/g, such as cristobalite meal, substances which induce electrical conductivity, pigments, soluble dyes, plasticizers, pure organic resins, agents which improve the adhesion of elastomeric or non-elastomeric products, and agents which inhibit or retard cross-linking, other than the sulfur compounds of this invention.

The thermosetting organopolysiloxane compositions of this invention may be used in all applications in which the use of thermosetting organopolysiloxane compositions is desirable. Thus, the compositions of this invention may for example be used as embedding compositions, for example for electronic components, especially during mass production with machines, as well as for machine-operated immersion coatings. The long "pot-life" achieved in accordance with this invention even at higher temperatures, is of great advantage when the compositions are used as sealants, adhesives, encapsulating agents, for molding objects including cable-end closures, for coatings which repel adhesive substances, i.e., paper coatings, and as coating for fabrics, as well as in the manufacture of electrical heating elements.

All parts and percentages are by weight unless otherwise specified.

The platinum-vinylsiloxane complex mixture and diluent used in the following examples was prepared in the following manner:

About 20 parts of sodium bicarbonate were added to a mixture containing 10 parts of $H_2PtCl_6 \cdot 6H_2O$, 20 parts of 1,3-divinyl-1,1,3,3-tetramethyldisiloxane and 50 parts of ethanol. The mixture was heated for 30 minutes under reflux with constant agitation, then allowed to stand for 15 hours and then filtered.

The volatile components were removed from the filtrate by distilling at approximately 12 mm Hg (abs.). The residue consists of 17 parts of a liquid which was dissolved in benzene. The solution was filtered and the benzene distilled off from the filtrate. The residue was diluted with a sufficient amount of an organopolysiloxane as a diluent having a viscosity of 2000 mm².s⁻¹ at 25° C. and consisting of 14 mol percent of methylvinylsiloxane, 14 mol percent of methylhydrogensiloxane, 43 mol percent of phenylsiloxane and 29 mol percent of trimethylsiloxane units to provide a mixture containing 1 percent of platinum calculated as elemental platinum.

EXAMPLE 1

An organopolysiloxane having a viscosity of 2000 mm².s⁻¹ at 25° C. and consisting of 14 mol percent of methylvinylsiloxane, 14 mol percent of methylhydrogensiloxane, 43 mol percent of phenylsiloxane and 29 mol percent of trimethylsiloxane units is mixed with 20 mg of platinum, calculated as elemental platinum, in the form of a solution containing 1 percent by weight of platinum and consisting of a platinum-vinylsiloxane complex and diluent, per kilogram of the Si-bonded hydrogen containing organopolysiloxane. The mixture obtained is then mixed with 0.01 percent of each of the following components:
2-mercaptobenzothiazole
N,N-dimethyldithiocarbamic acid
zinc-N,N-dimethyldithiocarbamate
zinc benzothiazylsulfide
dibenzothiazyldisulfide
benzothiazyl-2-N,N-diethylsulfenamide
benzothiazyl-2-N-cyclohexylsulfenamide
tetramethylthiuram monosulfide and
tetramethylthiuram disulfide.

All percentages are based on the total weight of the mixture containing the organopolysiloxane having Si-bonded hydrogen and the platinum-vinylsiloxane complex and diluent.

The mixtures obtained were heated to 80° C. for 150 hours. The viscosities of all of the mixtures were below 4000 mm$^2$.s$^{-1}$ at 25° C.

The mixtures were then heated to 175° C. for 4 hours. The resultant mixtures cured at a temperature of 175° C. within a relatively short period of time to form materials having a Shore-D hardness of from 60 to 70.

COMPARISON TEST

An organopolysiloxane having a viscosity of 2000 mm$^2$.s$^{-1}$ at 25° C. and consisting of 14 mol percent of methylvinylsiloxane, 14 mol percent of methylhydrogensiloxane, 43 mol percent of phenylsiloxane and 29 mol percent trimethylsiloxane units, is mixed with 20 mg of platinum, calculated as elemental platinum, in the form of a mixture containing 1 weight percent platinum of the platinum-vinylsiloxane complex and diluent per kilogram of the Si-bonded hydrogen containing organopolysiloxane. The mixture is then mixed with 0.1 percent of each of the following components:
benzotriazole
1,1-ethinylcyclohexanol
triallylcyanurate
p,p'-dioctyldiphenylamine
dimethylformamide
pyridine
N,N-dimethyl-N'-pentamethylenetiourea All of the above percentages are based on the total weight of the mixture of an organopolysiloxane having Si-bonded hydrogen and the platinum-vinylsiloxane complex and diluent.

The mixtures obtained were then heated to 80° C. for 100 hours. Following this treatment none of these mixtures were flowable.

What is claimed is:

1. A thermosetting organopolysiloxane composition comprising (1) an organosilicon compound having on the average at least two Si-bonded hydrogen atoms per molecule (2) an organosilicon compound containing on the average at least two monovalent hydrocarbon radicals per molecule having aliphatic multiple bonds, (3) a catalyst which promotes the addition of Si-bonded hydrogen to the aliphatic multiple bonds and (4) an organic compound which inhibits curing at room temperature selected from the group consisting of 2-mercaptobenzothiazole, zinc benzothiazylsulfide, dibenzothiazyl disulfide, benzothiazyl-2-N,N-diethylsulfenamide, benzothiazyl-2-N-cyclohexylsulfenamide, benzothiazyl-2-N,N-diisopropylsulfenamide, dithiocarbamic acid, N,N-dimethyldithiocarbamic acid, piperidine-N-pentamethylenedithiocarbamate, zinc-N,N-dibenzyldithiocarbamate, bismuth-N,N-dimethyldithiocarbamate, tellurium-N,N-diethyldithiocarbamate, zinc-N,N-di-n-butyldithiocarbamate, zinc-N,N-dimethyldithiocarbamate, lead di-N,N-methyldithiocarbamate, N,N-tetramethyldithiocarbamylsulfenamide, dithiocarbamylsulfenamide, tetramethylthiuram monosulfide, tetra-n-octadecylthiuram monosulfide, di-N-pentamethylenethiuram monosulfide, tetramethylthiuram disulfide, tetra-n-butylthiuram disulfide and di-N-pentamethylene thiuram tetrasulfide.

2. The composition of claim 1, wherein the organosilicon compound (1) has units of the formula

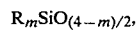

$$R_mSiO_{(4-m)/2},$$

where R is selected from the group consisting of hydrogen, monovalent hydrocarbon radicals and substituted monovalent hydrocarbon radicals, in which an average of at least two Si-bonded hydrogen atoms are present per molecule, m is 0, 1, 2 or 3 and on the average the units contain at least as many organic radicals as Si-bonded hydrogen atoms.

3. The composition of claims 1 or 2, wherein the organosilicon compound (2) has units of the formula

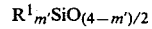

$$R^1_{m'}SiO_{(4-m')/2}$$

where R$^1$ is selected from the group consisting of monovalent hydrocarbon radicals and substituted monovalent hydrocarbon radicals, in which on the average at least two of the R$^1$ radicals and no more than 50 percent of the number of R$^1$ radicals per molecule have aliphatic multiple bonds and m' is 0, 1, 2 or 3.

4. The composition of claims 1 or 2, wherein the catalyst is a platinum catalyst.

* * * * *